US00RE35971E

United States Patent [19]

Kessler

[11] E Patent Number: Re. 35,971

[45] Reissued Date of Patent: Nov. 24, 1998

[54] RESILIENT STRIP AND MOUNTING MEMBER FOR FLUSH FITTING PROTECTIVE STRIP ASSEMBLY

[75] Inventor: Gerald Kessler, Youngstown, Ohio

[73] Assignee: Boston Metal Products Corp., Medford, Mass.

[21] Appl. No.: 234,683

[22] Filed: Apr. 28, 1994

Related U.S. Patent Documents

Reissue of:

[64] Patent No.: 5,110,650
Issued: May 5, 1992
Appl. No.: 688,646
Filed: Apr. 19, 1991

U.S. Applications:

[63] Continuation of Ser. No. 383,905, Jul. 21, 1989, Pat. No. 5,013,596.

[51] Int. Cl.[6] ..... E04F 19/02; B60J 11/00

[52] U.S. Cl. ..... 428/100; 428/31; 428/122; 52/717.05; 52/718.04; 52/718.01; 24/294; 24/297; 24/293

[58] Field of Search ..... 428/31, 98, 99, 428/100, 122; 293/126, 128; 52/717.05, 718.04, 718.01; 24/292–297

[56] References Cited

U.S. PATENT DOCUMENTS

| | | | |
|---|---|---|---|
| 4,083,592 | 4/1978 | Rubin et al. | 293/71 R |
| 4,808,451 | 2/1989 | McCue et al. | 428/31 |
| 5,013,596 | 5/1991 | Kessler | 428/100 |

FOREIGN PATENT DOCUMENTS

| | | | |
|---|---|---|---|
| 331393 | 7/1958 | Switzerland | 428/31 |
| 2200870 | 2/1987 | United Kingdom | 428/31 |

*Primary Examiner*—Alexander S. Thomas
*Attorney, Agent, or Firm*—Hale and Door LLP

[57] ABSTRACT

The invention features an elongated strip of resilient material, which strip is secured in and partially surrounds a mounting member, where the resilient strip member has a semi-cylindrical body with a pair of circumferentially facing edge portions. The resilient strip also includes a pair of oppositely disposed, radially-inwardly extending solid, wedge shaped latch members, each extending longitudinally of the latch member and located between one of the edge portions and a point 45 degrees away from the mid-line of the semi-cylindrical body. The mounting member includes a web portion having a pair of oppositely disposed web-latch extensions extending across a chord of the semi-cylindrical body, substantially parallel to a tangent to the circumference of the semi-cylindrical body at its mid-line, and at least one leg member extending from the web portion away from the semi-cylindrical body. A pair of oppositely disposed base members, each extend from a leg member, away from each other and each terminate in a base latch portion. Each of the pair of web latch extensions mates with the semi-cylindrical body adjacent the solid radial latch member, between the latch member and the mid-line of the semi-cylindrical body and each of the pair of base latch portions mates with the semi-cylindrical body adjacent the radial latch member, between the latch member and the closest edge portion.

20 Claims, 5 Drawing Sheets

RESILIENT STRIP AND MOUNTING MEMBER FOR FLUSH FITTING PROTECTIVE STRIP ASSEMBLY

Matter enclosed in heavy brackets [ ] appears in the original patent but forms no part of this reissue specification; matter printed in italics indicates the additions made by reissue.

This is a *reissue of Ser. No. 07/688,646, filed on Apr. 19, 1991, now U.S. Pat. No. 5,110,650, which is a* continuation of co-pending application Ser. No. 07/383,905, filed on Jul. 21, 1989, now U.S. Pat. No. 5,013,596.

BACKGROUND OF THE INVENTION

This invention relates generally to protective bumper strip assemblies for protecting furniture edges, wall and display case surfaces and the like, and more particularly to an improved resilient bumper strip and mounting member for such assemblies. Protective strip assemblies using resilient strip materials in various types of channels are known in the art, as illustrated in U.S. Pat. Nos. 4,083,592, and 4,808,451 and the patents cited therein. The protective strip assembly disclosed in the 4,808,451, patent is shown in FIG. 1 and includes a metal channel capped by strip of a resilient material, such as rubber. The channel, which may be roughly rectangular in its outside cross-section, attaches to a surface to be protected. The resilient rubber strip surrounds and engages the channel along the channel faces that face generally perpendicular to the surface to be protected. The rubber strip therefore butts up against the surface to be protected, wholly concealing the channel. It may also be arranged to be flush with a surface perpendicular to the one to which it is attached.

The resilient strip of the prior art suffers from a number of drawbacks, illustrated with reference to the FIGS. Referring to FIG. 1, a resilient strip assembly 10 is shown in perspective, showing a resilient strip 14 and a mounting member 18, with some portions of the resilient strip 14 removed. The resilient strip 14 is generally a semi-cylindrical body 22 which surrounds the mounting member 18 on three of its four sides. The mounting [number]*member* 18 may be secured to the surface to be protected 26 by means of mounting screws shown representatively at 30 which secure the mounting member through hole 34.

Referring now also to FIG. 2, which shows the resilient strip 14 and mounting member 18 in cross section, it can be seen that the semi-cylindrical body 22 of the resilient strip is bounded by circumferentially facing edge portions 38. Radially extending latch members 42 extend radially inwardly from the semi-cylindrical body 22 at a location between the edge portions 38 and a point 45 degrees away from the mid-line 72 of the semi-cylindrical body 22. Radially extending latch members 42 extend longitudinally along the length of the resilient strip 14. Flanking each radially extending latch member 42 are a pair of radii 46 and 50. Radially projecting latch members 42 are hollow, each having a lumen 54 running along the length thereof. Lumens 54 facilitate assembling and disassembling the strip assembly, by providing a releasable spring retention force, as explained below.

With reference to FIGS. 2 and 5, the structure of the mounting member 18 may be seen. The mounting member 18 is used with both the resilient strip of the prior art and the resilient strip of the present invention. The present invention also includes an improved mounting member. The mounting member 18 of the prior art has a web portion 62, which includes a pair of oppositely disposed web latch extensions 66. When the mounting member 18 and resilient strip 14 are assembled, the web portion 62 extends across a chord of the semi-cylindrical body 22, substantially parallel to a tangent to the circumference of the semi-cylindrical body portion at its mid-line 72.

A pair of oppositely disposed, spaced apart leg members 76 extend from the web portion 62, away from the semi-cylindrical body 22. From each leg member 76 extends a base member 82. The base members 82 extend away from each other. Each base member 82 terminates in a base latch portion 86.

As oriented in FIG. 2, the web latch extensions 66 extend outwardly to a position closely adjacent but inward of an upward projection of the base latch portions 86 and the base latch portions 86 extend upwardly to a position closely adjacent but below an outward projection of the web latch extensions 66.

The mating of the resilient strip 14 of the prior art and mounting member 18 is also illustrated with reference to FIG. 2. The web latch extensions 66 of the web portion 62 are sized to extend to the semi-cylindrical body 22 adjacent the hollow radially inwardly extending latch portions 42. Likewise, the base latch portions 86 mate with the semi-cylindrical body 22 adjacent the other side of the hollow radially extending latch portions 42. Thus, each hollow radially extending latch portion 42 is clamped between a respective web latch extension 66 and base latch portion 86. Insertion is facilitated due to the presence of lumens 54, which permit snug retention of the strip 14 in the mounting member 18. As the resilient strip 14 is pressed against the mounting member 18, the leading edges of the hollow radially extending latch members 42 wedge between web latch member 66 and base latch member 86. *Insertion is facilitated due to the presence of lumens 54, which permit snug retention of the strip 14 in the mounting member 18. As the resilient strip 14 is pressed against the mounting member 18, the leading edges of the hollow radially extending latch members 42 wedge between web latch member 66 and base latch member 86*, which latch members squeeze together the walls of the hollow radially extending latch member 42.

As will be understood, the shortest distance N (FIG. 5) between web latch extension 66 and base latch portion 86, perpendicular to the path of insertion of radially extending latch member 42 (parallel to the arrow I), should be smaller than the width of fully expanded hollow latch member 42, to impede removal. Further, the space W beyond the narrowest spot N should be wider than the narrowest distance to permit the radially extending latch member 42 to expand after insertion, thereby locking itself in place. The compressibility of the lumens 54 permit this expanding locking engagement. If hollow latch members 42 were solid and still of the same cross-sectional dimensions relative to the mounting member 18, it would take a great force to compress the solid resilient material of latch member 42 so that it could be inserted through the narrow gap N.

While the lumens 54 facilitate engagement, they create other problems. Resilient strips 14 are typically manufactured by extrusion. It is relatively difficult to uniformly extrude long sections having long hollows, such as the lumens 54. The width of the outside dimension of the latch extension 42 varies unacceptably, as does the wall thickness and thus the size of the lumen 54. As will be understood, the dimensions of the lumens 54 determine the degree of force required to engage the resilient strip 14 and the mounting member 18, and also the degree of force that will dislodge the strip 14 from the mounting member 18 once engaged. The variations in lumen dimensions that arise under commercially reasonable extrusion conditions are unacceptably great: some production runs of the strips 14 must be scrapped because they cannot be engaged with the mounting member 18, and others must be rejected because they engage the mounting member too loosely. Variations from one extreme to the other also can arise along the length of a single extruded strip.

Another drawback relates to the fit between the elongated resilient strip 14 and accessories, such as corner pieces and connectors. FIG. 3 illustrates a corner assembly for use with the prior art and the claimed invention with some parts of the strip removed and some not shown. The corner assembly includes a corner piece 250 and an adaptor 252. Each piece has a virtually identical mounting portion 256, 258, which engages resilient strip 14. The corner piece 250 has a slotted quarter spherical head portion 260. The adaptor has a head portion with a curved tongue 262 of a size and shape to fit within the slot of the head on the corner section 260. The terminal portion of the tongue and the deepest most recess of the receptacle are congruently shaped to provide a positive engagement achieved upon the resilient locking of the fully inserted tongue into the slotted head. The corner assembly is described fully in U.S. patent application serial number [unknown] *383,763*, entitled "Corner Assembly for Flush Fitting Protective Strip Assembly." filed in the name of Myron Ullman [concurrently herewith which is hereby incorporated by reference herein] *U.S. Pat. No. 5,033,244*.

As shown with reference to FIG. 4, it is desirable for the terminal edge 280 of strip 14 to mate smoothly with the edge 282 or quarter spherical head 260, as shown at S. However, due to the difficulties of molding the latch extensions 42, the outside dimension of the strip 14 is often irregular, typically flaring out into a "hip" adjacent the radial latch extension 42. Consequently, the mating between the edge 280 of strip 14 and edge 282 of quarter spherical head 260 is uneven, as shown at U. This creates a sloppy appearance and is thus, undesirable.

Thus, some of the principal objects of the invention are: to provide a protective strip assembly that permits the resilient strip to extend to flush up against the surface to be protected; to provide a strip that may be manufactured reliably and consistently; to provide a strip that engages reliably with a mounting member, to provide a strip having a controllable outside dimension that fits flush with corner assemblies and other accessories; and to provide a flush mounting strip assembly that is inexpensive to make and that may be easily and confidently assembled.

SUMMARY OF THE INVENTION

The resilient strip of the invention may be used in connection with the mounting member of the prior art described above. The strip is secured in and partially surrounds the mounting member thus completely concealing it. The resilient strip member is a semi-cylindrical body having a pair of circumferentially facing edge portions. The resilient strip also includes a pair of oppositely disposed, radially-inwardly extending solid latch members, each extending longitudinally of the strip and located between one of the edge portions and a point away from the mid-line of the semi-cylindrical body. A chord of the semi-cylindrical strip body, substantially parallel to a tangent to the circumference of the semi-cylindrical body at its mid-line coincides with the extent of the mounting member web-latch extensions. A pair of oppositely disposed base members, each extend from a leg member, away from each other and each terminate in a base latch portion. Each of the pair of web latch extensions extend toward the semi-cylindrical body adjacent the radial latch member, between the latch member and the mid-line of the semi-cylindrical body. Each of the pair of base latch portions contact the radial latch member intermediate its radial extension. The radial latch members may terminate in a small hook, having its opening on the side of the radial latch member nearest the base member of the mounting member.

The mounting member of the invention improves over the prior art in that the base latch portions terminate in hooks with the opening facing the opening of the hook on the radial latch member. The hook on the mounting member provides additional retention security if necessary.

Because the radially extending latch member is solid, the extrusion difficulties do not arise. Thus, the dimensions of the radial latch member may be confidently controlled and the production waste is minimized. Further, the outside dimension may be controlled to provide a smooth joint from the elongated strip to the corner piece or other accessory.

BRIEF DESCRIPTION OF THE FIGURES OF THE DRAWING

Like elements are referred to by like reference in the various figures numerals.

DETAILED DESCRIPTION OF THE PREFERRED EMBODIMENTS OF THE INVENTION

Figure 6:
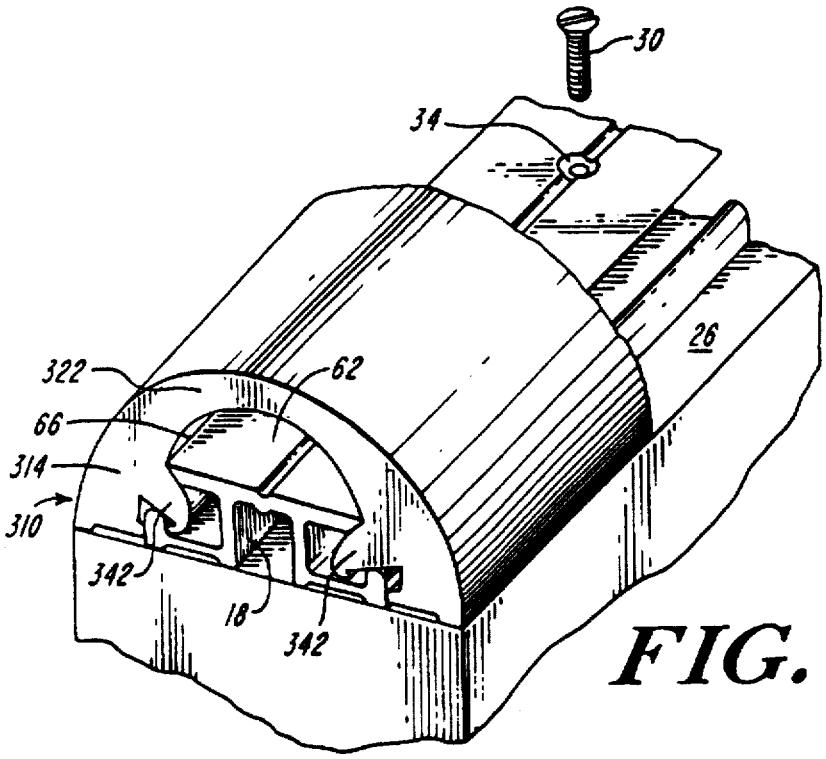
FIG. 6 is a perspective view of a portion of a combined resilient strip of the claimed invention and mounting member of the prior art with some portions of the resilient strip removed.

Referring to FIG. 6, a resilient strip assembly 310 is shown in perspective, showing a resilient strip 314 of the claimed invention and a mounting member 18 of the prior ar, with some portions of the resilient strip 314 removed. The resilient strip 314 is generally a semi-cylindrical body 322, which surrounds the mounting member 18 on three of its four sides. The mounting strip 18 may be secured to the surface to be protected 26 by means of mounting screws shown representatively at 30 which secure the mounting member through hole 34.

Figure 8:
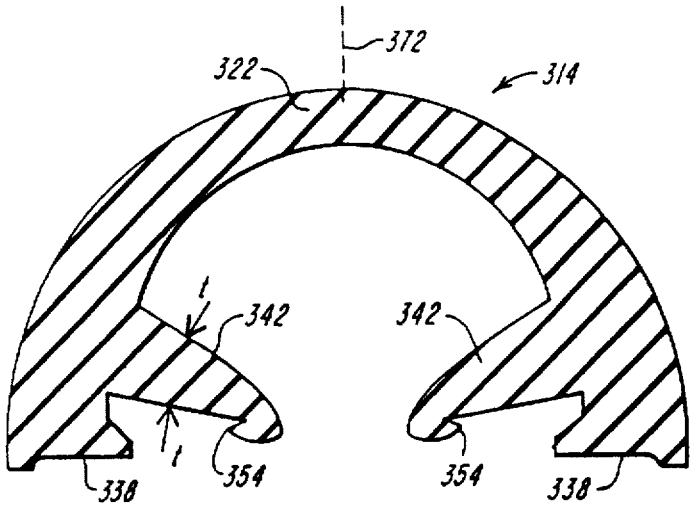
FIG. 8 is a to scale cross-section of the resilient strip of the invention.

Referring now also to FIG. 8, which shows the resilient strip 314 alone, it can be seen that the semi-cylindrical body 322 is bounded by circumferentially facing edge portions 338. Latch members 342 extend radially inwardly from the semi-cylindrical body 322 at a location between the edge portions 338 and a point 45 degrees away from the mid-line 372 of the semi-cylindrical body 322. As shown in FIG. 6, radial latch members 342 extend longitudinally along the length of the resilient strip 314. Radially extending latch members 342 are solid, each terminating in a small hook 354. Hooks 354 facilitate retention of resilient strip 314 by mounting member 18, as explained below.

Figure 7:
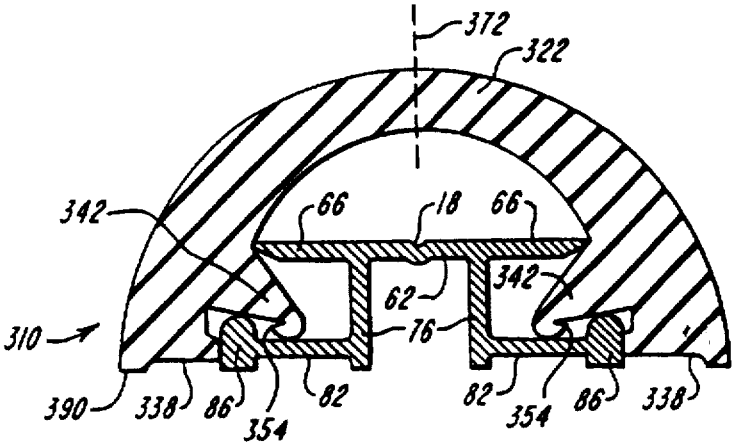
FIG. 7 is a to scale cross-section of the resilient strip of the invention also showing the mounting member of the prior art.

Referring to FIG. 7, it can be seen that when the mounting member 18 and resilient strip 314 are assembled, the web portion 62 of mounting member 18 extends across a chord of the semi-cylindrical body 322, substantially parallel to a tangent to the circumference of the semi-cylindrical body portion at its mid-line 372.

As oriented in FIG. 7, the web latch extensions 66 of the mounting member 18 extend outwardly to a position closely adjacent but inward of an upward projection of the base latch portions 86 and the base latch portions 86 extend upwardly to a position closely adjacent but below an outward projection of the web latch extensions 66.

The latch extensions 66 of the web portion 62 are sized to extend to the semi-cylindrical body adjacent the radially inwardly extending solid latch members 342. It is not necessary that the web-latch extensions 66 actually contact the semi-cylindrical body 322 or the radial latch members 342. The base latch portions 86 mate with the semi-cylindrical body 322 adjacent the other side of the radially extending latch members 342. Thus, each radially extending latch member 342 is located between a respective web latch extension 66 and base latch portion 86.

Engagement of the strip 314 with the mounting member 18 is facilitated due to the generally wedge shape of latch members 342. As the resilient strip 314 is pressed against the mounting member 18, the leading edges of the radially extending latch members 342 wedge between web latch member 66 and base latch member 86. The thickness of the radially extending latch members 342 (measured between arrows t) is less than the shortest distance N (FIG. 5) between web latch extension 66 and base latch portion 86, perpendicular to the path of insertion (parallel to the arrows I) of radially extending latch member 342. Because the thickness of the radial latch members 342 is less than N, they insert easily.

Figure 1:
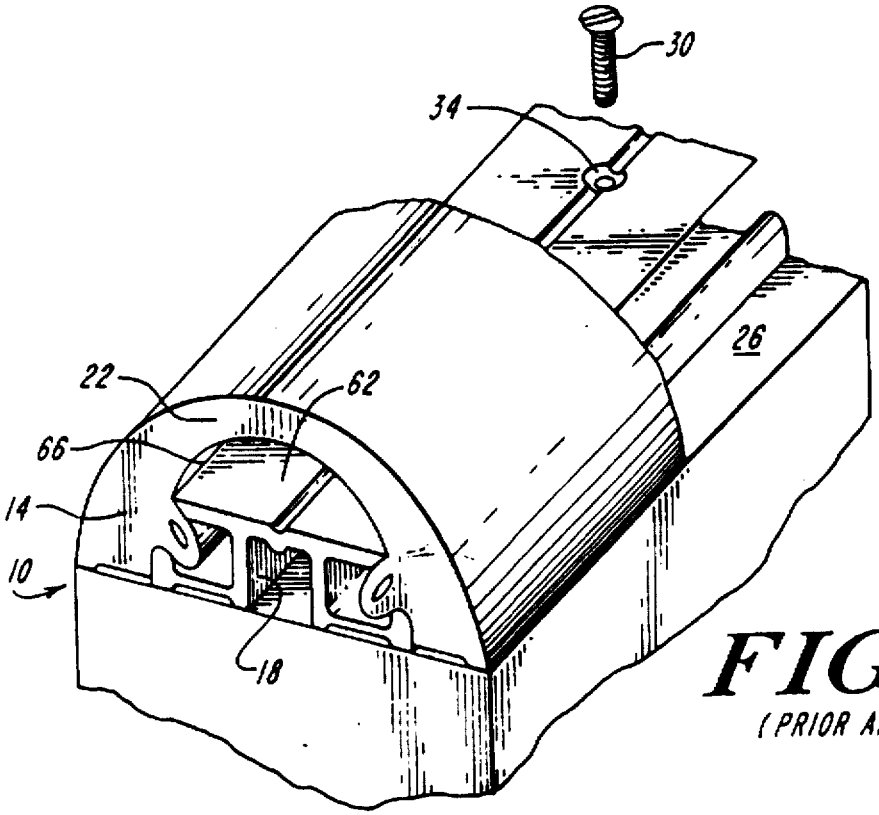
FIG. 1 (PRIOR ART)
FIG. 1 is a perspective view of a portion of a combined resilient strip of the prior art and mounting member assembly, with some portions of the resilient strip removed.
Figure 2:
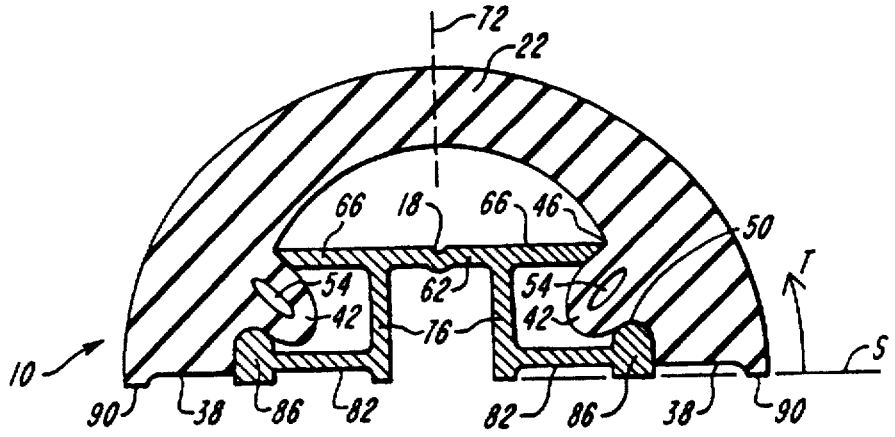
FIG. 2 (PRIOR ART)
FIG. 2 is a to scale cross-section of the prior art showing both the mounting member and the resilient strip.
Figure 3:
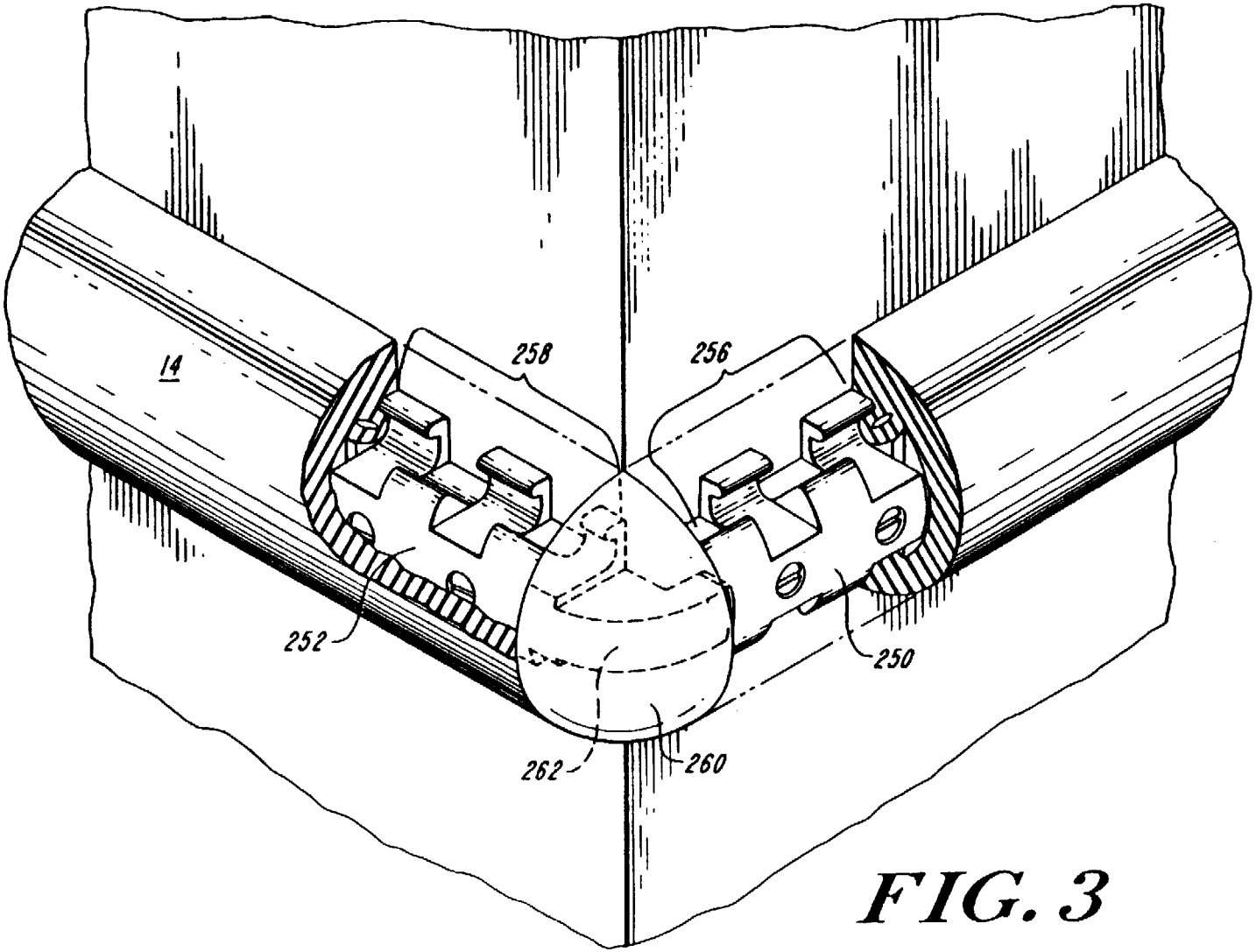
FIG. 3 is a perspective view of a corner assembly suitable for use in connection with the prior art and the claimed invention shown with the resilient strip of the prior art, with some portions of the strip broken away and some portions not shown.
Figure 4:
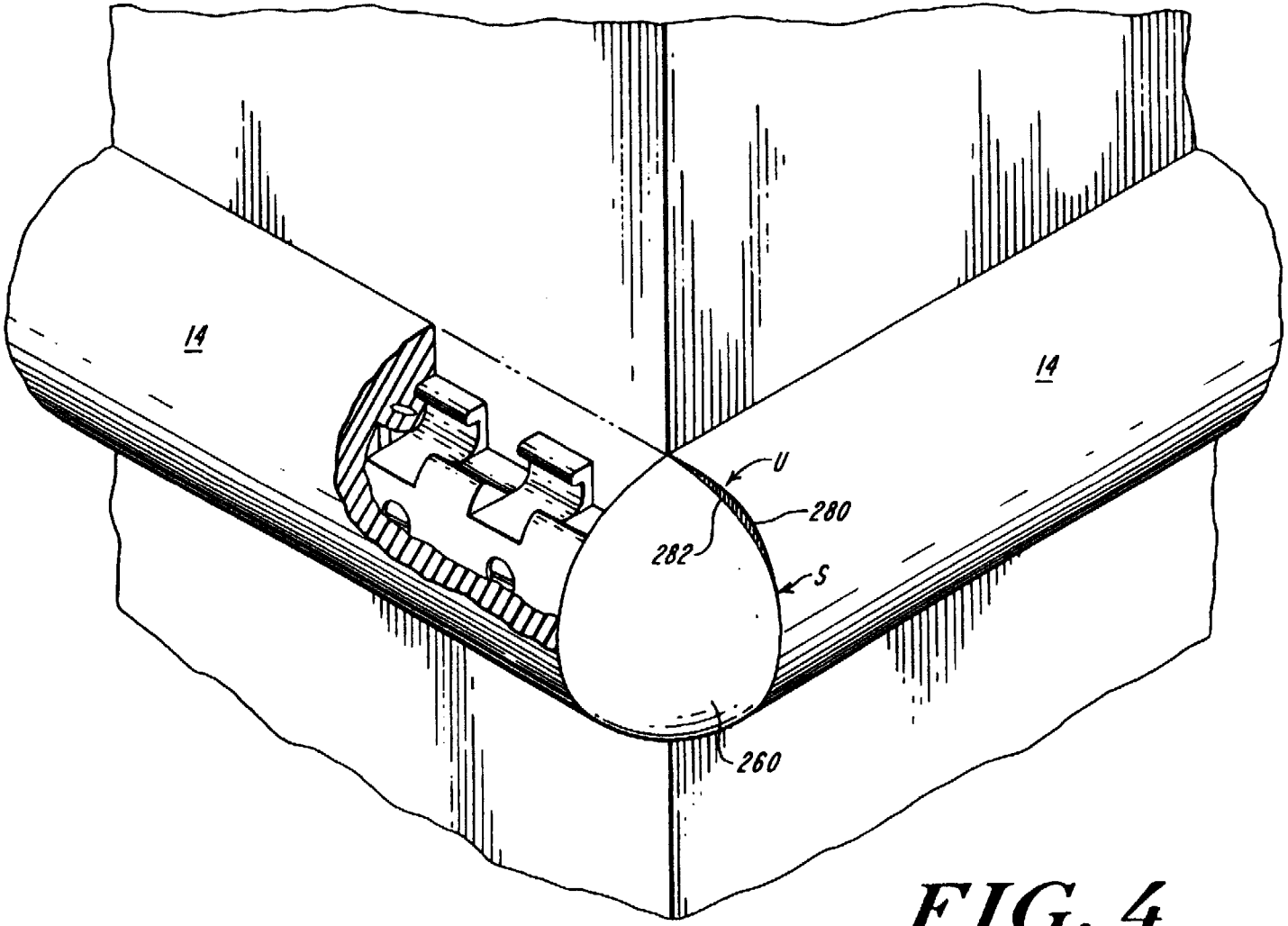
FIG. 4 is a perspective view of the corner assembly and protective strip assembly shown in FIG. 3, showing a complete resilient strip of the prior art.
Figure 5:
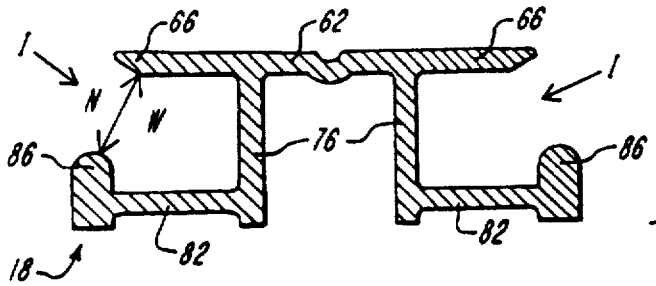
FIG. 5 is a to scale cross-section of the mounting member of the prior art.
Figure 9:
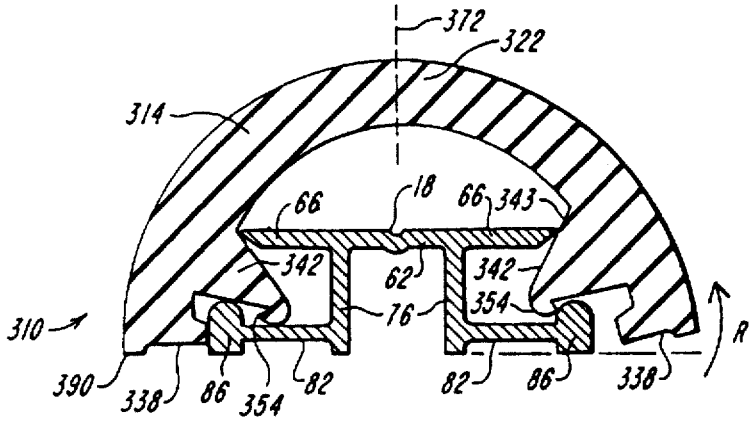
FIG. 9 is a to scale cross-section of the resilient strip of the invention, and the mounting member of the prior art, with the resilient strip shown being forced away along one longitudinal edge.

The manner by which the resilient strip 314 is retained by mounting member 18 will be understood with reference to FIG. 9. In the case of a force or moment in the direction indicated by arrow R tending to remove the resilient strip, the base 343 of radially extending latch member 342 contacts the end of web latch extension 66, and tends to pivot about it. At the same time, hook 354 at the end of radial latch member 342 is swung into contact with base latch portion 86, which prevents removal of the radially extending latch member 342 from the space W (FIG. 5). Hook 354 is not absolutely necessary, however, it enhances the retention.

The foregoing discussion illustrates the important parameters regarding the size of the radially extending latch member 342. They should be long enough so that when a force R is applied and the base 343 of latch member 342 contacts web latch extension 66, the tip of latch member 342 pivots into base latch portion 86 and is retained.

The mounting member of the invention is illustrated with reference to FIG. 10 and may be used in situations where additional security is required in the engagement of the resilient strip 314 and the mounting member.

Figure 10:
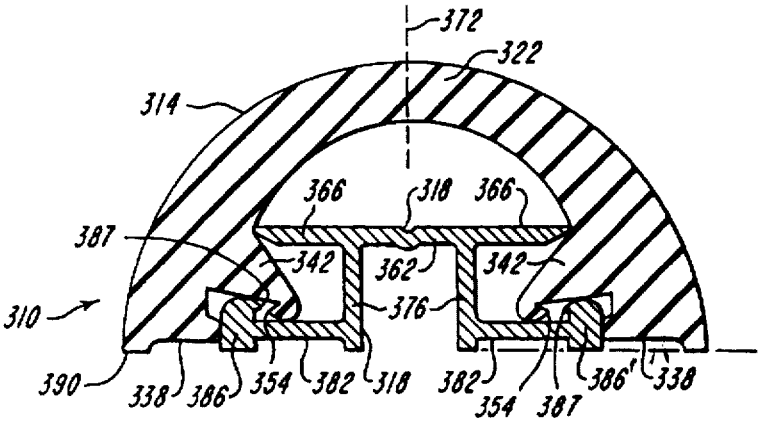
FIG. 10 is a to scale cross-section of the resilient strip of the invention and the mounting member of the invention.

As shown in FIG. 10, mounting member 318 is provided with hooks 387 at the ends of base latch portions 386. The open portion of mounting member hooks 387 face the open portion of radial latch member hooks 354. When the resilient strip 314 is forced away from the mounting member 318, the hooks 354 and 387 engage each other and lock the resilient strip 314 to the mounting member 318.

Additional features of the invention will be appreciated by those skilled in the art. The strip portion may be advantageously made from vinyl, such as polyvinyl chloride. Polyvinyl chloride is non-marking and provides a high degree of impact and abrasion resistance. It may be colored to virtually any desirable color.

The flush mounted strip assembly may be advantageously used around refrigeration cases, along walls and corridors *to protect the walls and corridors* from impact due to moving carriages, around checkout counters in grocery and department stores, around island displays in department stores and upon the ends of display cases. The strips protect not only the surface upon which they are mounted, but also objects and persons that may contact those surfaces.

The foregoing description should be taken as illustrative and not limiting in any sense. Other embodiments of the invention will occur to those skilled in the art and are within the scope of the following claims.

What is claimed is:

1. An elongated protective strip [of resilient material] to be secured in and partially surrounding a mounting member, said [resilient] strip comprising:

(a) a body partially surrounding the mounting member and having a pair of edge portions; and (b) a pair of oppositely disposed, inwardly extending solid latch members, each terminating in a hook having an opening on the side of the latch member facing away from the mid-line of the body and each latch member located between a point 45 degrees away from the mid-line of the body and another point 90 degrees away from the mid-line, in the same direction.

2. The protective strip of claim 1 said extending latch member comprising an elongated wedge extending in the direction of elongation of the strip.

3. The protective strip of claim 2 said body having a substantially uniform wall thickness around its perimeter and along its length.

4. A protective strip assembly comprising, in combination, a mounting member and an elongated strip [of resilient material] secured in and partially surrounding the mounting member;

(a) The [resilient] strip comprising:

(1) a body having an outer surface partially surrounding the mounting member and having a pair of edge portions; and (2) a pair of oppositely disposed, inwardly extending solid latch members, each terminating in a hook having an opening on the side of the latch member facing away from the mid-line of the body and each latch member located between a point 45 degrees away from the mid-line of the body and another point 90 degrees away from the mid-line, in the same direction; and (b) The mounting member comprising:

(1) a web portion having a pair of oppositely disposed web latch extensions extending generally across a chord of the body;

(2) at least one leg member extending from the web portion away from the body;

(3) a pair of oppositely disposed base members:

(i) each extending from a leg member, away from each other;

(ii) each terminating in a base latch portion; wherein each of the pair of web latch extensions mates with the body adjacent extending latch member between the extending latch member and the mid-line of the body, and each of the pair of base latch portions mates with the body adjacent the extending latch member between the extending latch member and the closest end portion.

5. The protective strip assembly of claim 4, said body having a substantially uniform wall thickness around its perimeter and along its length.

6. The protective strip assembly of claim 5, said base latch portions terminating in a hook.

7. The strip assembly of claim 4 where the mounting member comprises an elongated channel and the web portion, web latch extensions, leg members, base members and base latch extensions extend along the channel in the direction of its elongation.

8. The strip assembly of claim 7 wherein the web latch extensions are defined by beads which extend along the web portion in the direction of channel elongation.

9. The strip assembly of claim 7 where the base latch portions are defined by beads which extend along the base members in the direction of channel elongation.

10. The protective strip assembly of claim 4 where the radially extending latch member comprises an elongated wedge extending in the direction of elongation of the strip.

*11. The protective strip of claim 3, wherein the strip is a resilient strip.*

*12. The protective strip of claim 2, wherein the strip is a resilient strip.*

*13. The protective strip of claim 1, wherein the strip is a resilient strip.*

*14. The protective strip assembly of claim 6, wherein the strip is a resilient strip.*

*15. The protective strip assembly of claim 5, wherein the strip is a resilient strip.*

*16. The protective strip assembly of claim 8, wherein the strip is a resilient strip.*

*17. The protective strip assembly of claim 9, wherein the strip is a resilient strip.*

*18. The protective strip assembly of claim 7, wherein the strip is a resilient strip.*

*19. The protective strip assembly of claim 10, wherein the strip is a resilient strip.*

*20. The protective strip assembly of claim 4, wherein the strip is a resilient strip.*

* * * * *